(12) United States Patent
Fleming

(10) Patent No.: US 7,159,397 B1
(45) Date of Patent: Jan. 9, 2007

(54) TENSILE-STRESSED MICROELECTROMECHANICAL APPARATUS AND TILTABLE MICROMIRRORS FORMED THEREFROM

(75) Inventor: James G. Fleming, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/146,811

(22) Filed: Jun. 7, 2005

(51) Int. Cl.
F01B 29/10 (2006.01)

(52) U.S. Cl. .................. 60/528; 310/306; 359/224

(58) Field of Classification Search .................. 60/527, 60/528; 310/306, 307; 359/223, 224, 290, 359/291
See application file for complete search history.

(56) References Cited

U.S. PATENT DOCUMENTS

| | | | |
|---|---|---|---|
| 6,023,121 A | 2/2000 | Dhuler et al. | |
| 6,201,629 B1 * | 3/2001 | McClelland et al. | 359/223 |
| 6,300,665 B1 | 10/2001 | Peeters et al. | |
| 6,366,414 B1 | 4/2002 | Aksyuk et al. | |
| 6,422,011 B1 * | 7/2002 | Sinclair | 60/528 |
| 6,545,385 B1 | 4/2003 | Miller et al. | |
| 6,647,164 B1 | 11/2003 | Weaver et al. | |
| 6,756,244 B1 * | 6/2004 | Liebeskind | 438/14 |
| 6,831,391 B1 * | 12/2004 | Miller et al. | 310/309 |
| 6,954,301 B1 * | 10/2005 | Nguyen et al. | 359/290 |
| 2004/0165243 A1 | 8/2004 | Helmbrecht | |

OTHER PUBLICATIONS

Weider Tang, et al, "Novel multi-user-MEMS-processes-compatible single-layer out-of-plane electrothermal actuator" Society of Photo-Optical Instrumentation Engineers, 2003, vol. 2, No. 2, pp. 91-95.
S. Habermehl, "Stress relaxation in Si-rich silicon nitride thin films," Journal of Applied Physics, vol. 83, No. 9, May 1, 1998 pp. 4672-4677.

* cited by examiner

Primary Examiner—Hoang Nguyen
(74) Attorney, Agent, or Firm—John P. Hohimar

(57) ABSTRACT

A microelectromechanical (MEM) apparatus is disclosed which includes a pair of tensile-stressed actuators suspending a platform above a substrate to tilt the platform relative to the substrate. A tensile stress built into the actuators initially tilts the platform when a sacrificial material used in fabrication of the MEM apparatus is removed. Further tilting of the platform can occur with a change in the ambient temperature about the MEM apparatus, or by applying a voltage to one or both of the tensile-stressed actuators. The MEM apparatus can be used to form a tiltable micromirror or an array of such devices, and also has applications for thermal management within satellites.

24 Claims, 8 Drawing Sheets

Section 1 - 1

Section 1 - 1

Section 1 - 1

TENSILE-STRESSED MICROELECTROMECHANICAL APPARATUS AND TILTABLE MICROMIRRORS FORMED THEREFROM

GOVERNMENT RIGHTS

This invention was made with Government support under Contract No. DE-AC04-94AL85000 awarded by the U.S. Department of Energy. The Government has certain rights in the invention.

CROSS REFERENCE TO RELATED APPLICATIONS

This application is related to U.S. patent application Ser. No. 11/103,311 filed on Apr. 11, 2005, and Ser. No. 11/118,573 filed on Apr. 29, 2005.

FIELD OF THE INVENTION

The present invention relates in general to microelectromechanical (MEM) devices, and in particular to a tensile-stressed MEM apparatus which can be used as a tiltable platform on a substrate and which has applications for forming tiltable micromirrors or arrays thereof.

BACKGROUND OF THE INVENTION

Micromachining is an emerging technology for batch manufacturing many different types of mechanical and electromechanical devices on a microscopic scale using technology which was originally developed for fabricating integrated circuits (ICs). Micromachining generally avoids the use of built-in stress in a completed device since this can be detrimental to device operation.

The present invention relates to a tensile-stressed MEM apparatus wherein a pair of tensile-stressed actuators are used tilt a suspended platform, with an angle of tilt of the platform being variable in response to a change in tensile stress within the actuators.

The MEM apparatus of the present invention can operate passively with the tilt angle of a platform varying in response to a change in ambient temperature. Alternately, one or both of the tensile-stressed actuators can be electrically actuated to control and vary the tilt angle of the platform.

The MEM apparatus of the present invention has applications for forming tiltable micromirrors and variable emissivity devices.

These and other advantages of the present invention will become evident to those skilled in the art.

SUMMARY OF THE INVENTION

The present invention relates to a microelectromechanical (MEM) apparatus which comprises a substrate; a pair of tensile-stressed actuators located proximate to each other on the substrate to provide two oppositely-directed forces; and a platform suspended above the substrate by the pair of tensile-stressed actuators, with the platform being tiltable at an angle relative to the substrate in response to the two oppositely-directed forces acting at different locations on the platform.

The MEM apparatus can further comprise means for changing a temperature of at least one of the pair of tensile-stressed actuators to change the angle of tilt of the platform relative to the substrate. The means for changing the temperature of at least one of the pair of tensile-stressed actuators can comprise a change in an ambient temperature. Alternately, the means for changing the temperature of at least one of the pair of tensile-stressed actuators can comprise a voltage applied to one of the pair of tensile-stressed actuators to resistively heat that tensile-stressed actuator and thereby reduce the tensile stress therein.

The substrate can comprise silicon. Each tensile-stressed actuator can comprise a tensile-stressed material such as tungsten or silicon nitride. When the tensile-stressed actuators comprise tungsten, they can further comprise titanium nitride to improve the adhesion of the tungsten during deposition thereof. When the tensile-stressed actuators comprise silicon nitride, they can further comprise polycrystalline silicon (also termed polysilicon) for electrical conductivity.

The platform can comprise tungsten. Additionally, the platform can have a mesh structure and can optionally include a light-reflecting surface.

The present invention further relates to a MEM apparatus which comprises a substrate; a platform suspended above the substrate and further comprising a plurality of platform layers stacked one upon another and interconnected; a first tensile-stressed actuator connected between one of the platform layers and the substrate to suspend the platform above the substrate; and a second tensile-stressed actuator connected between another of the platform layers and the substrate to suspend the platform above the substrate, with a tensile stress in each tensile-stressed actuator acting to tilt the platform at an angle relative to the substrate. The angle of the platform relative to the substrate can be varied in response to actuation of one or both of the tensile-stressed actuators, or in response to an ambient temperature. Actuation of the tensile-stressed actuators can be performed by applying a voltage which heats one or more tensile-stressed beams therein to change the tensile stress.

The substrate can comprise silicon; and each tensile-stressed actuator can comprise tungsten or silicon nitride. To actuate a silicon nitride tensile-stressed actuator, polycrystalline silicon can be included therein for electrical conductivity. The platform can comprise tungsten, and can further comprise a light-reflecting surface.

The present invention also relates to a MEM apparatus which comprises a substrate; and a platform suspended above the substrate by a plurality of tensile-stressed beams arranged in pairs proximate to the platform. One tensile-stressed beam of each pair of tensile-stressed beams can be connected to the platform proximate to a top thereof, with the other tensile-stressed beam of each pair of tensile-stressed beams being connected to the platform proximate to a bottom thereof. In this way, the plurality of tensile-stressed beams can provide a torsional force to tilt the platform at an angle to the substrate.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIG. 7 also shows the mesh structure used to form the platform, tab, and anchors.

DETAILED DESCRIPTION OF THE INVENTION

Figure 1:
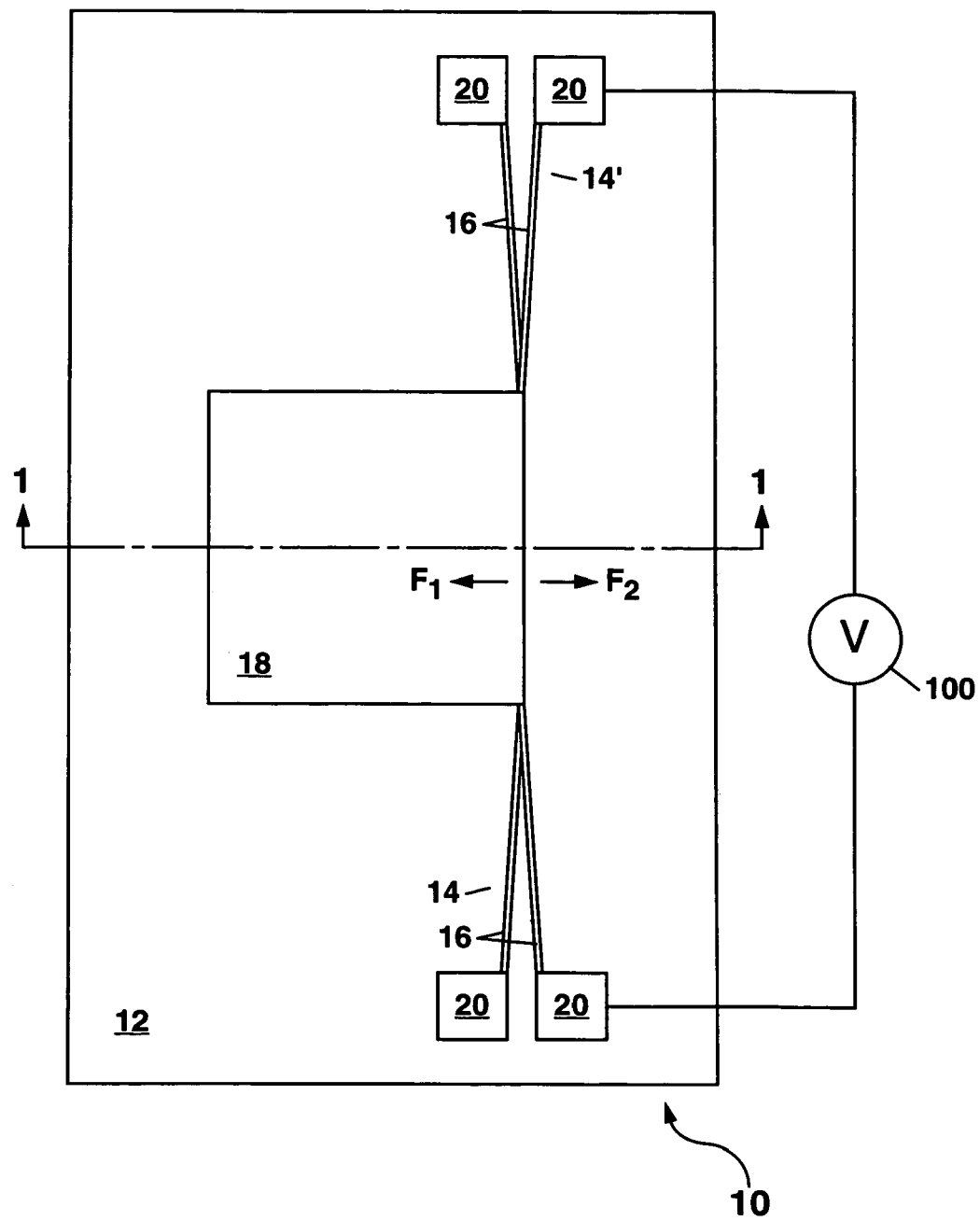
FIG. 1 shows a schematic plan view a first example of the MEM apparatus of the present invention in an as-fabricated position prior to removing a sacrificial material which surrounds the various elements of the MEM device and prevents any movement therein.

Referring to FIG. 1, there is shown schematically in plan view a first example of the MEM apparatus 10 of the present invention. The MEM apparatus 10 comprises a substrate 12 having a pair of tensile-stressed actuators 14 and 14' formed thereon. Each tensile-stressed actuator 14 and 14' comprises one or more tensile-stressed beams 16 having an overall bent shape, and with each beam 16 having a longitudinally-directed tensile stress therein. The tensile-stressed actuators 14 and 14' are located proximate to each other on the substrate 12, and are connected to a platform 18 which is suspended above the substrate 12 by the tensile-stressed actuators 14 and 14'. Each tensile-stressed beam 16 is anchored to the substrate 12 through an anchor 20.

The MEM apparatus 10 can be fabricated by micromachining as will be explained in detail hereinafter. Initially, the MEM apparatus 10 is formed with a sacrificial material 22 contacting the various elements of the device 10 and restraining any motion thereof. This is illustrated in FIG. 2A which shows a schematic cross-section view of the MEM apparatus 10 of FIG. 1 taken along the section line 1—1 after the device 10 has been built up during fabrication, but prior to removal of the sacrificial material 22.

Figure 2A:
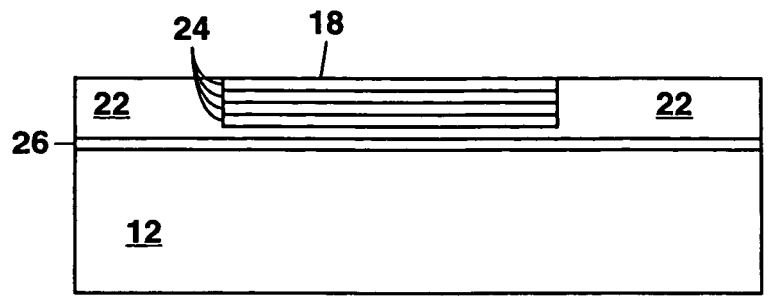
FIG. 2A shows a schematic cross-section view of the MEM device of FIG. 1 in the as-fabricated position prior to removing the sacrificial material.

In FIG. 2A, the platform 18 is shown formed from a plurality of platform layers 24 which are stacked one upon another and interconnected. Each tensile-stressed actuator 14 and 14' is connected to a different platform layer 24 to provide a vertical separation between the beams 16 of each actuator 14 and 14'. As an example, the tensile-stressed actuator 14 in FIGS. 1 and 2A–2C is shown connected to the bottom of the platform 18 (i.e. to a platform layer 24 nearest the substrate 12); and the tensile-stressed actuator 14' is connected to the top of the platform 18 (i.e. to a platform layer 24 furtherest away from the substrate 12). In addition, the pair of tensile-stressed actuators 14 and 14' are oppositely oriented so that the longitudinally-directed tensile stress in each beam 16 of the actuator 14 produces a force $F_1$ which is directed to the left as shown by the left-facing arrow in FIGS. 1 and 2B; and the longitudinally-directed tensile stress in each beam 16 of the actuator 14' produces an oppositely directed force $F_2$ (indicated by the right-facing arrow in FIGS. 1 and 2B). The forces $F_1$ and $F_2$ arise from the longitudinally-directed tensile stress in each actuator 14 and 14' which acts to bring the beams 16 therein more in-line with each other (i.e. to try to straighten the overall bent shape of each tensile-stressed actuator 14 and 14'). These oppositely-directed forces $F_1$ and $F_2$ applied at different vertical locations on the platform 18 where the beams 16 are attached produce a torsional force on the platform 18 which tilts the platform 18 at an angle, θ, to the substrate 12 once the sacrificial material 22 is removed. This is schematically illustrated in the cross-section view of FIG. 2B and is also shown in the image of an actual MEM device 10 in FIG. 3.

Figure 2B:
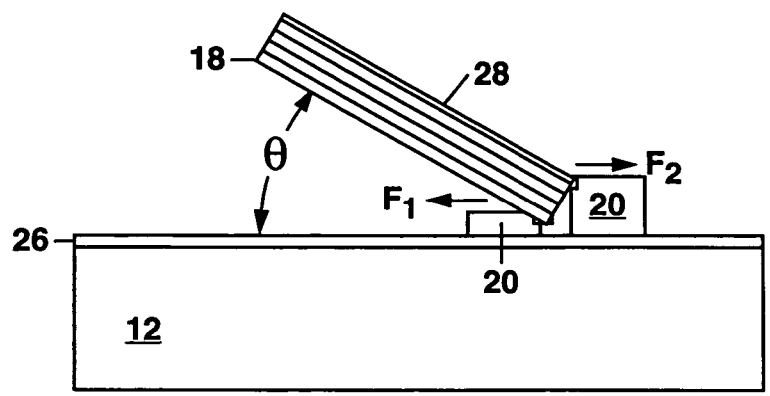
FIG. 2B shows a schematic cross-section view of the MEM device of FIG. 1 immediately after removing the sacrificial material to release the various elements of the MEM device for movement, with the platform being tilted at an angle θ relative to the substrate.

In FIG. 2B, the tilt angle, θ, can be up to several tens of degrees and will, in general, depend upon the magnitude of the forces $F_1$ and $F_2$ and a torsional moment arm due to the separation of the beams 16 of the different tensile-stressed actuators 14 and 14'. The tilt angle, θ, will also depend upon the size and mass of the platform 18. In the MEM device 10 shown in FIG. 3, the platform 18 is 100 μm square and 8 μm thick, with the beams 16 of each tensile-stressed actuator 14 and 14' being formed of tungsten with a length of 300 μm and with a width of 1.2 μm and a height of 2 μm. An angle separating the beams 16 on each side of the platform 18 can be, for example, 3–5 degrees. The resultant tilt angle, θ, for the MEM device 10 of FIG. 3 after removal of the sacrificial material 22 is about 20 degrees.

Figure 2C:
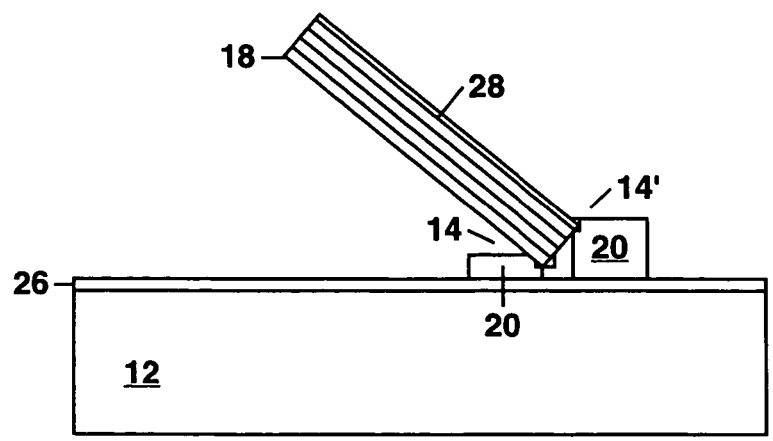
FIG. 2C shows a schematic cross-section view of the MEM device of FIGS. 1 and 2B when the tilt angle of the platform is increased by reducing an ambient temperature about the MEM device. Increasing the ambient temperature or actuating one or both of the tensile-stressed actuators with a voltage from an external voltage source can be used to decrease the tilt angle of the MEM device.

In FIG. 2C, the tilt angle of the platform 18 relative to the substrate 12 can be changed by activating one or both of the tensile-stressed actuators 14 or 14'. This can be done by changing the temperature of the tensile-stressed beams 16 in one or both of the tensile-stressed actuators 14 and 14'. Decreasing an ambient temperature about the tensile-stressed actuators 14 and 14' will increase the longitudinally-directed tensile stress in the beams 16, and this will increase the forces $F_1$ and $F_2$ which, in turn, will further increase the tilt angle, θ. Increasing the ambient temperature will have the opposite effect and will decrease the tilt angle, θ.

Alternately, a voltage, V, from an external voltage source 100 as shown in FIG. 1 can be applied to one or both of the tensile-stressed actuators 14 and 14' to resistively heat the tensile-stressed beams 16 therein and decrease the tilt angle, θ. In general, the change in the tilt angle, θ, will depend on whether one or both of the actuators 14 and 14' are actuated and the temperature to which the beams 16 therein are heated. Resistive heating with an applied voltage, V, can produce a temperature increase of up to several hundred ° C. for the beams 16 in each tensile-stressed actuator 14 and 14'.

The voltage source 100 in FIG. 1 can be connected to each tensile-stressed actuator 14 and 14' using the anchors 20 as contact pads. The anchors 20 can be electrically insulated from the substrate 12 by an intervening insulating layer 26 when the substrate 12 comprises silicon. Since the beams 16 are suspended above the substrate 12 and thermally isolated therefrom, resistive heating of the beams 16 can be done relatively quickly (on the order of up to a few tens of microseconds or less). The electrical input power required to heat the beams 16 of each tensile-stressed actuator 14 and 14' can be, for example, 50–150 milliwatts, with the voltage V generally being in the range of 1–100 volts depending upon an overall resistivity of the beams 16.

In the example of FIG. 1, the beams 16 on each side of the platform 18 can be up to several hundred microns or more in length and can have a height and width of up to a few microns ($\mu$m). The platform 18 in the example of FIG. 1 can have lateral dimensions of up to a few hundred microns or more, with a thickness of the platform generally being several times the thickness of each beam 16 (e.g. 4–20 $\mu$m).

Operation of the tensile-stressed actuators 14 and 14' in the MEM device 10 of the present invention are very different from that of conventional MEM thermal actuators. The tensile-stressed actuators 14 and 14' described herein provide the forces $F_1$ and $F_2$ as a result of built-in longitudinally-directed tensile stress in the beams 16 without the need for any applied electrical power; whereas a conventional thermal actuator requires that electrical power be applied for any force to be generated. The tensile-stressed actuators 14 and 14' of the present invention generate forces which are "pulling" in nature as the overall bent shape of each actuator 14 and 14' is urged to straighten due to the longitudinally-directed tensile stress built therein. A conventional thermal actuator provides a force which is "pushing" in nature. Additionally, when electrical power (i.e. the voltage V) is applied to the tensile-stressed actuators 14 and/or 14' of the present invention, the forces $F_1$ and/or $F_2$ are reduced. This, too, is exactly opposite a conventional thermal actuator wherein the "pushing" force is increased with increasing electrical power and heating.

Figure 3:
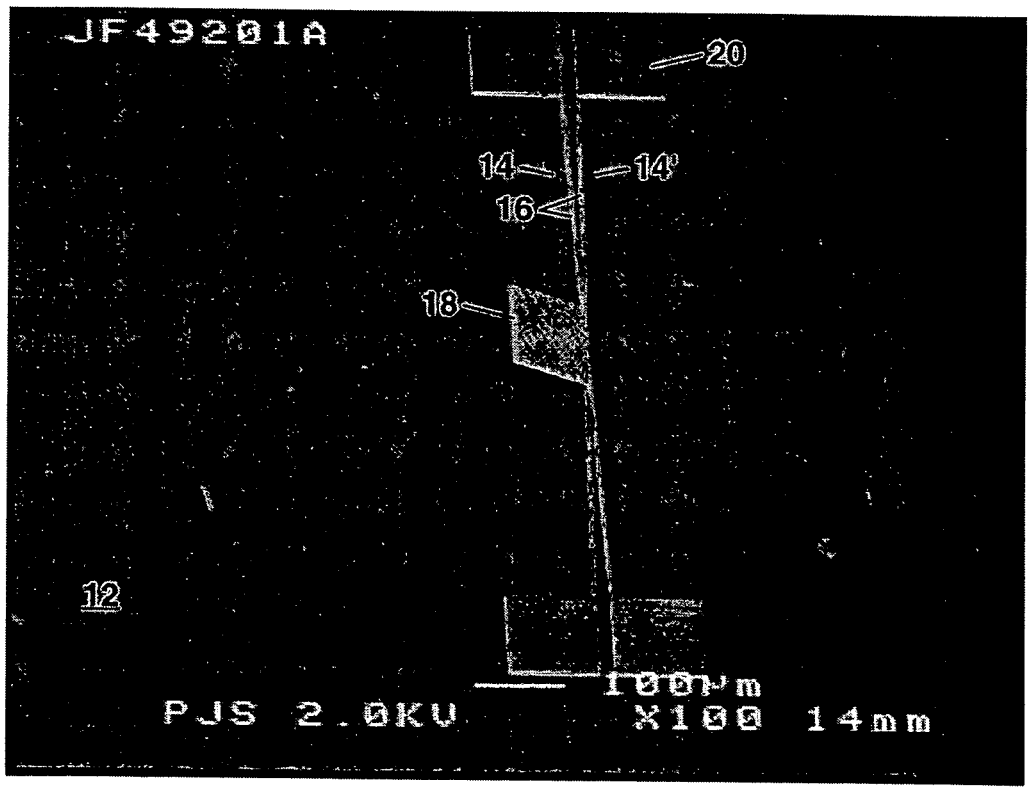
FIG. 3 shows an image of a MEM device 10 as in FIG. 1, with the platform being automatically tilted up by the pair of tensile-stressed actuators after removal of the sacrificial material.

The MEM apparatus 10 of FIGS. 1–3 can be fabricated by surface micromachining using tungsten as a tensile-stressed material to form the beams 16 and anchors 20 of each tensile-stressed actuator 14 and 14', and also to form the platform 18. A plurality of layers of tungsten are used to build up the structure of the MEM apparatus 10 using a fabrication process which is termed a molded tungsten process, and which is also referred to herein as a damascene process.

The substrate 12 can comprise silicon and can be initially prepared by forming the electrically-insulating layer 26 shown in FIG. 2A over top the substrate 12. The electrically-insulating layer 26 can be a composite layer which comprises a layer of a thermal oxide about 0.6 $\mu$m thick and an overlying layer of low-stress silicon nitride about 0.8 $\mu$m thick. The thermal oxide layer can be formed by a conventional wet oxidation process whereby the silicon substrate material is oxidized to form $SiO_2$ at an elevated temperature (e.g. 1050° C. for about 1.5 hours); and the low-stress silicon nitride layer can be deposited by low-pressure chemical vapor deposition (LPCVD) at about 850° C. One or more vias can be optionally photolithographically defined and etched through the electrically-insulating layer 26 to electrically ground the anchors 20 on one side of each tensile-stressed actuator 14 and 14' to the substrate 12 when this is desired.

Figure 4:
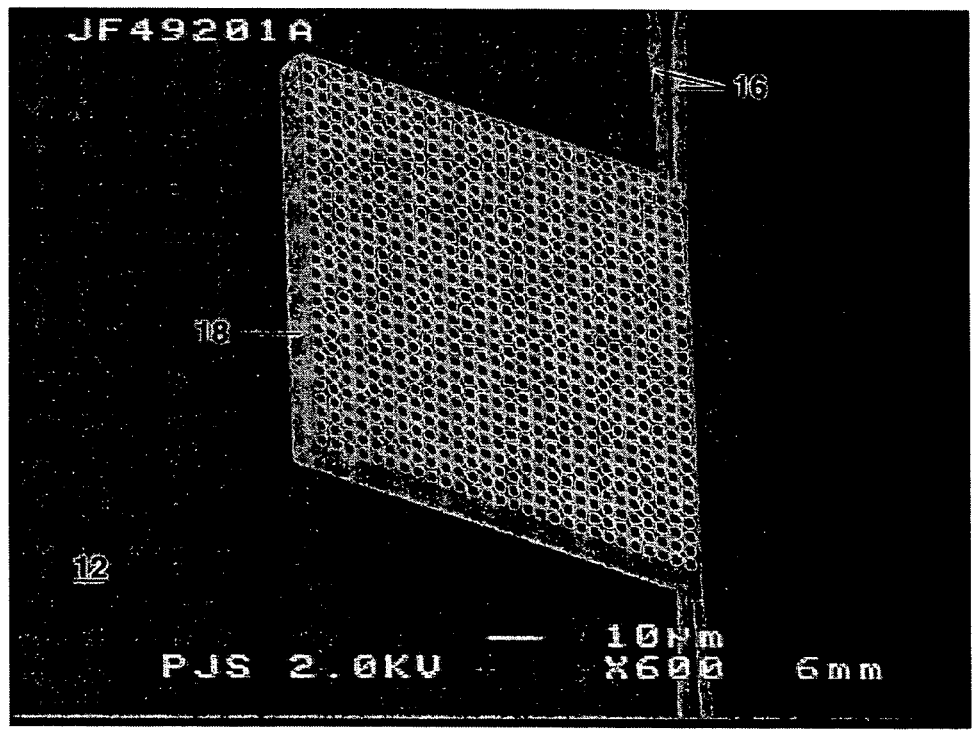
FIG. 4 shows an enlarged image of the MEM device of FIG. 3 to show details of the platform which has been formed with a mesh structure.

To begin fabrication of the tensile-stressed actuators 14 and 14' and the platform 18, a 2-$\mu$m thick layer of the sacrificial material 22 can be blanket deposited over the substrate 12. The sacrificial material 22 can be PETEOS which is a silicate glass formed from the decomposition of tetraethylortho silicate, also termed TEOS, by a plasma-enhanced chemical vapor deposition (PECVD) process. Openings can be etched through the sacrificial material 22 at the locations where the anchors 20 are to be attached to the substrate 12. The openings can be of arbitrary shape, including trenches and intersecting trenches. In particular, a mesh structure can be used for the anchors 20 and the platform 18 to minimize lateral stress due to the use of tungsten or silicon nitride as a tensile-stressed material. This mesh structure, which is shown for the platform 18 in FIG. 4 and for the anchors 20 and platform in FIG. 7, can comprise a plurality of intersecting trenches. Etching of the openings can be performed using a photolithographically-defined etch mask and reactive ion etching.

When the structure of the MEM apparatus 10 is being formed using tungsten as the tensile-stressed material, a 20–50 nanometer thick layer of titanium nitride (TiN) can be initially blanket deposited over the substrate 12 and in the openings using a sputter deposition process. The titanium nitride layer serves as an adhesion layer since tungsten does not stick or nucleate well on the PETEOS sacrificial material 22 which is essentially silicon dioxide. The titanium nitride layer is also compressively stressed and, together with the PETEOS sacrificial material 22 which is also compressively stressed, helps to compensate for a high level of tensile stress in each subsequently-deposited tungsten layer, thereby significantly reducing an accumulation of lateral stress which could otherwise lead to a bowing of the substrate 12 during fabrication of the MEM device 10.

Each tungsten layer can be blanket deposited over the substrate 12 by chemical vapor deposition (CVD) to fill in the openings. The tungsten layer can be up to about 0.8 $\mu$m thick, and can be deposited at a temperature of about 400° C. In general, for deposition of the tungsten by CVD at 400° C., the openings are formed as a plurality of intersecting trenches which can be, for example, 1.2 $\mu$m wide and 2 $\mu$m deep. Tens to hundreds of individual trenches can be used to form the platform 18 and anchors 20 (see FIGS. 4 and 7 which show a rectangular mesh structure formed from intersecting trenches which are 1.2 $\mu$m wide and spaced apart by 2.4 $\mu$m).

After deposition of the tungsten layer, the tungsten and titanium nitride overlying the sacrificial material 22 outside the openings can be removed by a chemical-mechanical polishing (CMP) process step to planarize the substrate and leave the titanium nitride and tungsten only in the openings.

A second layer of the sacrificial material 22 about 2-$\mu$m thick can then be blanket deposited over the substrate 12 and patterned with a photolithographically-defined etch mask and reactive ion etching to form a plurality of openings therein at locations wherein a second layer of titanium nitride and a second layer of tungsten is to be deposited. The second layers of titanium nitride and tungsten complete the anchors 20 and beams 16 for the tensile-stressed actuator 14, and are used to further build up the anchors 20 of the tensile-stressed actuator 14'. The second layers of titanium nitride and tungsten also form a bottom platform layer to begin to build up the platform 18.

After removing the titanium nitride and tungsten deposited over the sacrificial material 22 outside the openings with CMP, an additional three layers of the sacrificial material 22, titanium nitride and tungsten with the same layer thicknesses as described above can be added, in turn, to complete the platform 18, and the anchors 20 of the tensile-stressed actuator 14' as shown in FIG. 2A. The last layer of titanium nitride and tungsten, which forms a top platform layer, is also used to form the beams 16 of the tensile-stressed actuator 14'.

Once the structure of the MEM apparatus 10 has been built up as shown in FIG. 2A, the sacrificial material 22 can be etched away by immersing the substrate 12 into a selective wet etchant comprising hydrofluoric acid (HF) which does not substantially chemically attack the various layers of titanium nitride and tungsten or the substrate 12. This releases the MEM apparatus 10 so that the platform 18 is automatically urged to tilt upward by action of the tensile-stress actuators 14 and 14' (see FIGS. 2B and 4).

In the released MEM apparatus 10, the tensile stress in the beams 16, which can be on the order of 1 GigaPascal (GPa), arises primarily from a difference in the coefficient of thermal expansion of the tungsten (about $4.5 \times 10^{-6}$ °C.$^{-1}$) and the silicon substrate 12 (about $3 \times 10^{-6}$ °C.$^{-1}$) as the substrate 12 cools down from the tungsten deposition temperature of about 400° C. to room temperature. This large built-in tensile stress in the tungsten generally prevents the blanket deposition of a relatively thick ($\geq 1$ μm) tungsten layer and patterning of the tungsten layer by subtractive etching since the blanket deposition of a tungsten layer this thick can have a lateral stress sufficiently large to bow the silicon substrate 12 to an extent that would prevent further processing. Therefore, the damascene process described above, which forms the platform 18 and anchors 20 with a mesh structure, is used to provide stress compensation during fabrication of the MEM apparatus 10.

During fabrication of the platform 18 and anchors 20, the mesh structure of these elements can be filled in with the sacrificial material 22 or alternately with low-stress silicon nitride or polysilicon. When the sacrificial material 22 is used to fill in the openings in the mesh structure of the platform 18 and anchors 20, the sacrificial material 22 will be removed during the selective wet etching step with HF. When low-stress silicon nitride or polysilicon is used, these materials are retained in place in the completed MEM device 10 since they are resistant to etching by the HF.

An optional layer of a light-reflecting material 28 such as aluminum or gold can be deposited over the top of the platform 18 to form a light-reflecting surface. This can provide an enhanced reflectivity for light when the MEM apparatus 10 is to be used as a tiltable micromirror. The formation of the light-reflective surface can be done prior to removal of the sacrificial material 22, or afterwards using a shadow mask to deposit the aluminum or gold by evaporation or sputtering. The optional layer of the light-reflecting material 28 can be, for example, a few tenths of a micron thick (e.g. 0.2 μm).

Figure 5:
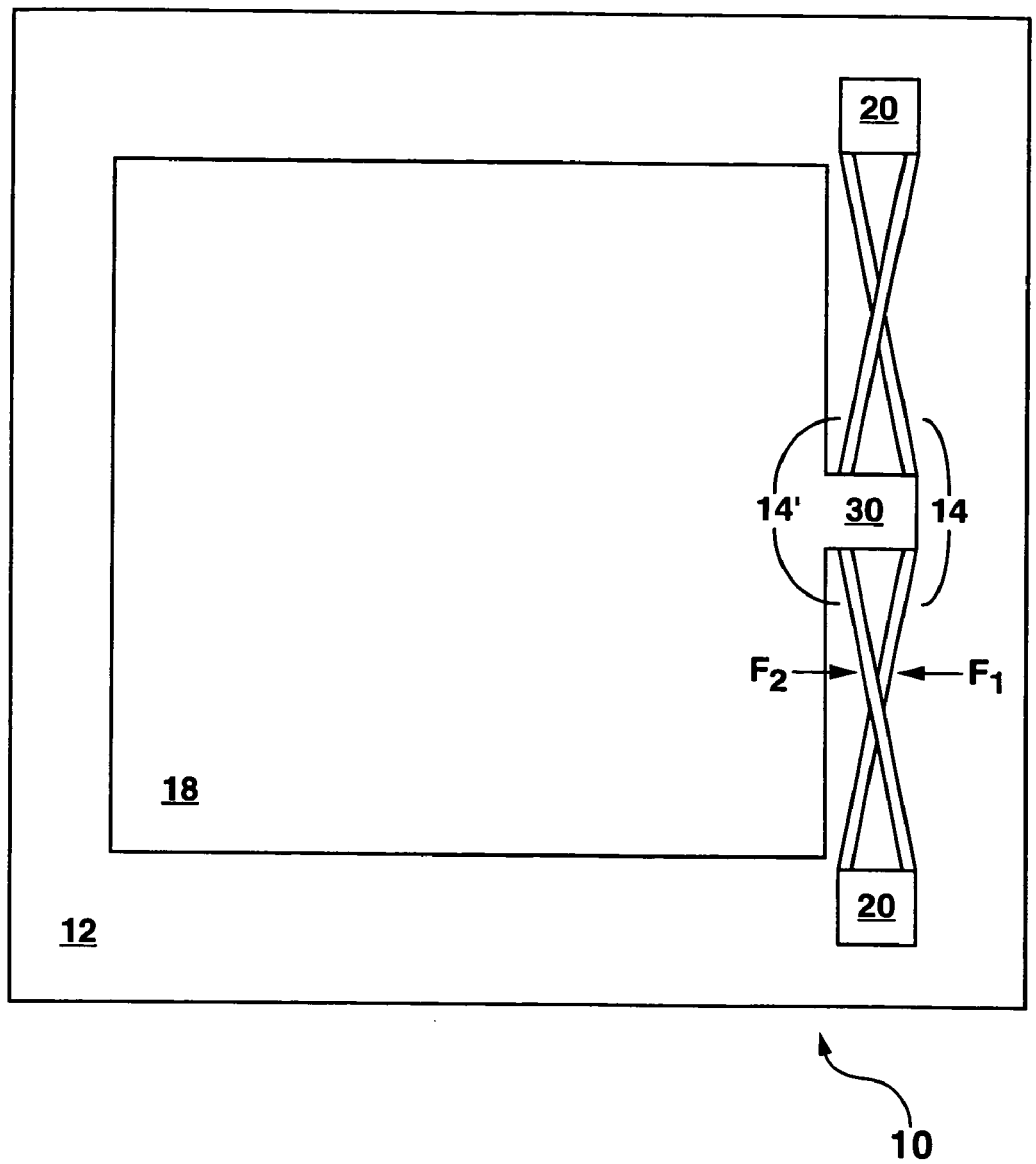
FIG. 5 shows a schematic plan view of a second example of the MEM apparatus of the present invention in an as-fabricated position prior to removing the sacrificial material which surrounds the various elements of the MEM device and prevents any movement therein.

FIG. 5 shows a schematic plan view of a second example of the MEM apparatus 10 of the present invention. In the example of FIG. 5, common anchors 20 are used for the pair of tensile-stressed actuators 14 and 14'. Additionally, a tab 30 extends outward from the side of the platform 18, with the beams 16 of each actuator 14 and 14' being attached to the tab 30 to suspend the platform 18 above the substrate 12 and to provide for tilting of the platform 18. This arrangement saves space as compared with the devices 10 shown in FIGS. 1–4, and also allows a plurality of MEM devices 10 to be arranged on a common substrate as a one-dimensional or two-dimensional array 50 having a relatively high fill factor (see FIGS. 6 and 7).

In the example of FIG. 5, the platform 18 and anchors 20 can be formed in a manner similar to that previously described using a plurality of stacked and interconnected layers of tungsten, with each tungsten layer being deposited over a titanium nitride adhesion layer. As an example, five tungsten layers can be used, with each tungsten layer being about 2 μm thick. The anchors 20 can be formed from all five of the tungsten layers; whereas the platform 18 including the tab 30 can be formed using only the top four tungsten layers (i.e. the platform layers). The beams 16 of the tensile-stressed actuator 14 can be formed from a second tungsten layer (i.e. a bottom platform layer); and the beams 16 of the tensile-stressed actuator 14' can be formed from a fifth tungsten layer (i.e. a top platform layer). Thus, the beams 16 for the tensile-stressed actuator 14, which are formed from the bottom platform layer, can cross underneath the beams for the tensile-stressed actuator 14' which are formed from the top platform layer.

Once the sacrificial material 22 used to fabricate the MEM device 10 in FIG. 5 has been removed, the platform 18 will automatically tilt upward due to the oppositely-directed forces $F_1$ and $F_2$ produced by the tensile-stressed actuators 14 and 14', respectively. A further increase in the tilt angle of the MEM device 10 is possible by cooling the ambient temperature about the MEM device 10 to cool the tensile-stressed beams 16 and increase a level of the tensile stress therein; whereas a decrease in the tilt angle can be produced by heating the beams 16 of the tensile-stressed actuators 14 and 14' to reduce the level of the tensile stress therein. Heating of the beams 16 can be performed either increasing the ambient temperature, or by using a voltage, V, from an external voltage source 100 which can be applied between the two anchors 20 to produce an electrical current which flows through the beams 16 to resistively heat them.

Figure 6:
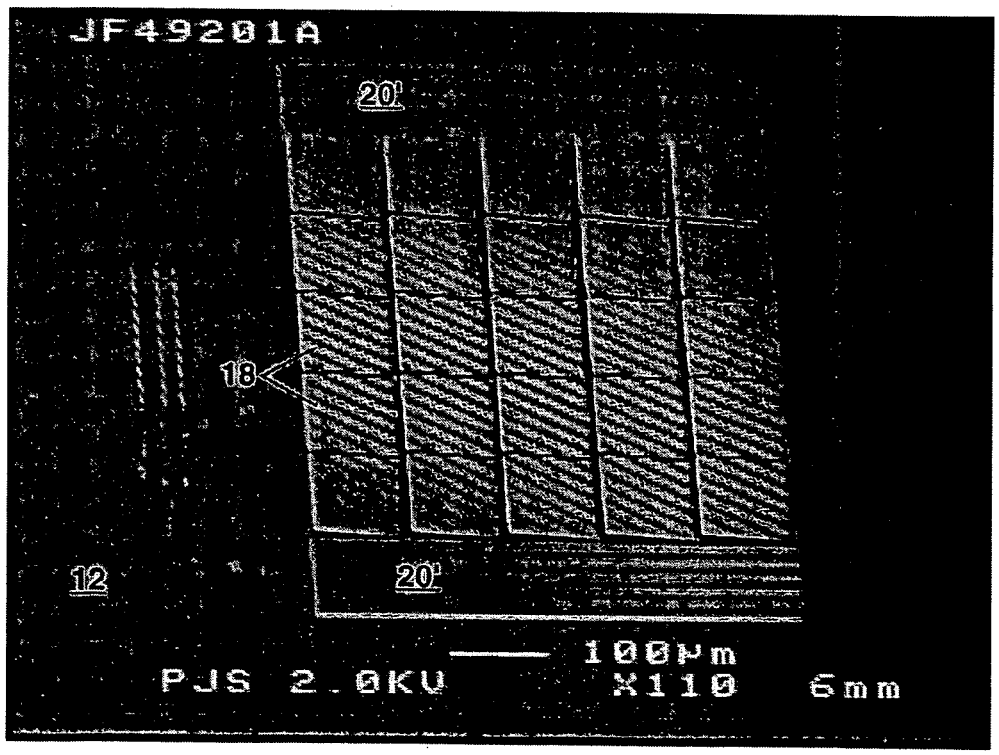
FIG. 6 shows an image of an array of MEM devices according to FIG. 5 formed on a common substrate.
Figure 7:
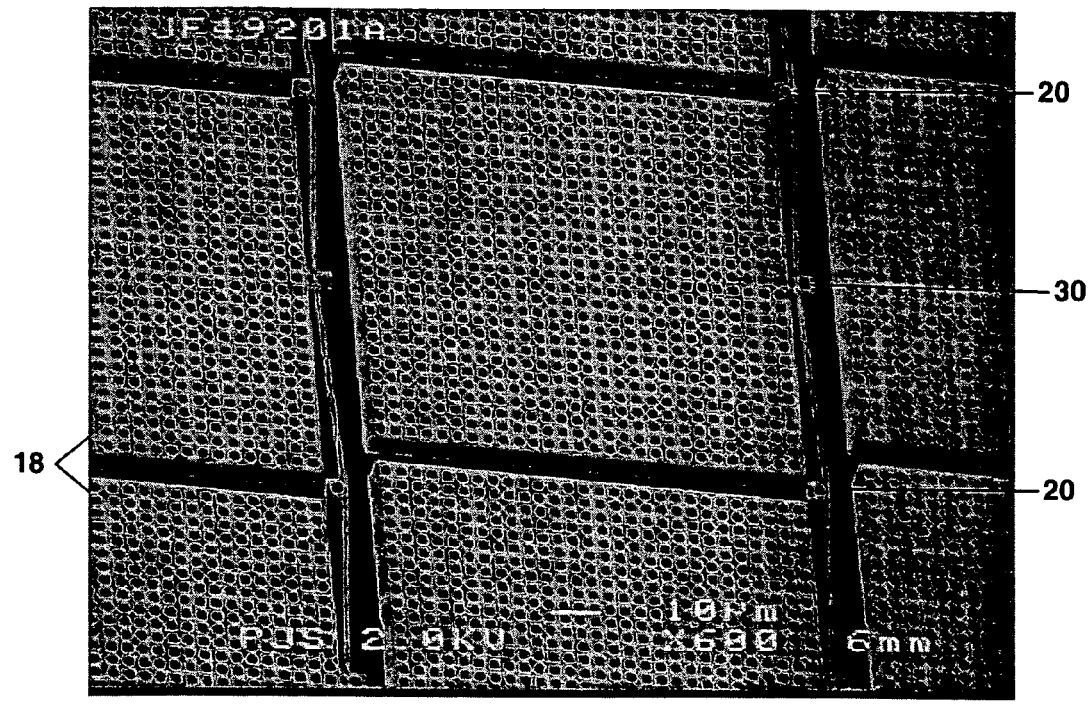
FIG. 7 shows an enlarged image of a portion of the array of MEM devices in FIG. 6 to show the use of a common anchor between each pair of adjacent MEM devices in each column of the array.

FIG. 6 shows a two-dimensional array 50 of MEM devices 10 formed according to the example of FIG. 5, with each MEM device 10 having a 100 μm square platform 18 which has been automatically tilted up at an angle θ relative to the substrate 12 after removal of the sacrificial material 22. In the example of the array 50 in FIG. 6, a common anchor 20 is used between each adjacent pair of platforms 18. This can be seen in FIG. 7 which is an enlarged image of a portion of the array 50 of FIG. 6. In FIG. 7, only the tensile-stressed actuators 14' connected to the top platform layer are visible. Each column of MEM devices 10 in FIGS. 6 and 7 is electrically connected in series, and adjacent columns of the MEM devices 10 are connected in parallel. This series/parallel electrical connection allows a relatively large pair of anchors 20' at the top and bottom of the columns of MEM devices 10 in the array 50 to be used as contacts for simultaneously electrically activating the entire array 50 of MEM devices 10 using a single voltage source 100 connected between the anchors 20'.

Those skilled in the art will understand that other arrangements for electrically activating an array 50 of MEM devices 10 according to the present invention are possible with the MEM devices 10 in the array 50 being independently electrically addressable, or addressable in sets (e.g. row or column addressing). Such an electrically addressable array 50 of MEM devices 10 can be provided with a light-reflecting surface as previously described and used, for example, for adaptive optics, for optical signal routing, for an optical projection display, etc.

Those skilled in the art will also understand that an array 50 of MEM devices 10 formed according to the present invention can be operated passively with the tilt angle of each MEM device 10 being variable in response to a change in ambient temperature. Such a passive array 50 may have applications, for example, in satellites where the array 50 could provide a surface having an emissivity or reflectivity which varies with temperature due to a change in the tilt angle of the platforms of a plurality of MEM devices 10 in the array 50. This can be useful in a satellite for controlling heat transfer into or out of the satellite depending upon an ambient temperature about the array 50 (e.g. depending on whether the array 50 is exposed to the sun or is directed away from the sun). A relatively large ambient temperature change of up to several hundred ° C. can occur on portions of a satellite depending upon the satellite's orientation relative to the sun, or away from the sun. This large ambient temperature change can allow a range of tilt angle of up to several tens of degrees so that the array 50 can be used much like a venetian blind to open or close to change a reflection angle of solar radiation, or to change the absorptivity and emissivity of the array 50.

In certain embodiments of the present invention, openings can be etched completely through the substrate 12 underneath each platform 18 in the array 50 so that light (i.e. radiation) can be transmitted through the array 50 when the platforms 18 are tilted upward at a relatively large angle, with the radiation being blocked when tilt angle of the platforms 18 is relatively small. This can allow the array 50 to be used as a window to allow solar radiation to be transmitted through the array 50 under certain circumstances (e.g. when the ambient temperature is relatively low), and to allow the solar radiation to be blocked under other circumstances (e.g. when the ambient temperature is relatively high). In the same way, the array 50 can be used for thermal management in satellites to transmit or block thermal radiation emitted by certain components (e.g. electronic circuitry) in the satellite, as needed.

Since the control of the array 50 can be done entirely passively using the ambient temperature, no additional electrical power is needed in the satellite for such applications. Furthermore, although the size of the array 50 in FIG. 6 is relatively small, such arrays 50 could be scaled up to dimensions of tens of centimeters or more, and multiple arrays 50 could be tiled to meet particular size requirements.

The various examples of the MEM apparatus 10 of the present invention described herein can also be fabricated using silicon nitride as the tensile-stressed material. The tensile-stressed silicon nitride can be formed by thermal CVD (i.e. CVD without a plasma) at a relatively high deposition temperature of about 800° C. and with a generally stoichiometric composition (i.e. $Si_3N_4$). When this is done, the tensile stress in the silicon nitride arises during cooling down to room temperature since the thermal expansion coefficient for silicon nitride (about $4\times10^{-6}$° $C.^{-1}$) is about one-third larger than that of the silicon substrate 12. There is also built-in stress arising from the deposition process itself.

Figure 8:
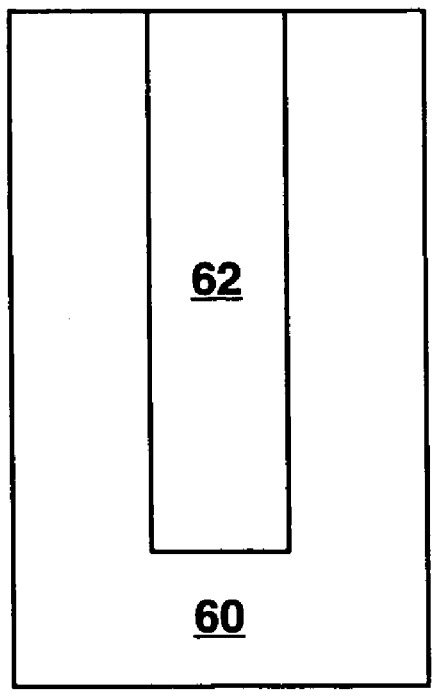
FIG. 8 shows a schematic cross-section view of a tensile-stressed beam formed with an outer portion of tensile-stressed silicon nitride and an inner portion of an electrically-conductive material.

To form MEM devices 10 which operate passively to change the tilt angle of the platform 18 in response to a change in ambient temperature, the tensile-stressed silicon nitride can be substituted for the titanium nitride and tungsten in forming the various elements of the MEM device 10 including the beams 16 and anchors 20 of the tensile-stressed actuators 14 and 14', and also the platform 18 and tab 30, if used. When the MEM devices 10 are to be electrically activated, then a modification in the direct substitution of the tensile-stressed silicon nitride for the titanium nitride and tungsten is needed since the tensile-stressed silicon nitride by itself is not electrically conductive. In this case, an electrically-conductive material such as doped polysilicon can be used in combination with the tensile-stressed silicon nitride to provide electrical conductivity for the beams 16 and anchors 20 of each tensile-stressed actuator 14 and 14'. This can be done by using a composite structure for the beams 16 and anchors 20. This is schematically illustrated in FIG. 8 which shows a cross-section view of a tensile-stressed beam 16 comprising an outer portion 60 formed of silicon nitride, and an inner portion 62 comprising the electrically-conductive material. This same composite structure can be used for a mesh structure for the anchors 20.

To form the composite structure of FIG. 8 with a width of, for example, 1.2 μm and a depth of 2 μm, about 400 nanometers of silicon nitride can be initially deposited by thermal CVD at about 800° C. to blanket the substrate 12 and to line trench-shaped openings formed in the sacrificial material 22 where the beams 16 are being formed. The remaining space in each opening can then be filled with polysilicon which has been doped for electrical conductivity with an impurity dopant such as phosphorous or boron. The polysilicon can be blanket deposited at a temperature of about 580° C. using LPCVD and annealed later to at least 800° C. to activate the impurity dopant. Any of the silicon nitride and polysilicon extending outside the openings can be removed by CMP to complete the portions 60 and 62. This process can be repeated as needed to build up additional layers of the composite structure of the tensile-stressed beams 16 and anchors 20 which are required to be electrically conductive, and also any portions of the platform 18 or tab 30 which are required to be electrically conductive.

For elements of the MEM apparatus 10 which do not need to be electrically conductive, the openings in the sacrificial material 22 for these elements can be completely filled with deposited silicon nitride. This can be done, for example, by making the openings for these elements narrower (e.g. 0.6 μm wide) so that the thermal CVD deposition of silicon nitride completely fills in the openings. Then, any subsequently-deposited polysilicon will lie completely outside these narrower openings and will be removed during the CMP step. This allows the use of a single mask to define both the non-conducting elements (e.g. portions of the platform 18) and the electrically-conducting elements (e.g. the beams 16, anchors 20, tab 30 and other portions of the platform 18) in each layer of the MEM apparatus 10, simply by controlling the opening size for the conducting and non-conducting elements. The non-conducting elements can have a mesh structure as previously described with a plurality of intersecting trenches about 0.6 μm wide.

The use of doped polycrystalline silicon as the electrically-conductive material will increase the resistivity as compared with tungsten. This will allow the use of a lower current and higher voltage for activation of the MEM device 10. The polysilicon in adjacent stacked layers having the composite structure of FIG. 8 can also be electrically connected in parallel or in series. This can be done by etching openings down through each subsequently-deposited silicon nitride outer portion 60 so that when the doped polysilicon inner portion 62 is deposited, it will fill in the openings and to form a series or parallel connection.

The various examples of the MEM apparatus 10 of the present invention can, in some instances, be fabricated on a substrate 12 containing complementary metal-oxide-semiconductor (CMOS) integrated circuitry. This can be done by forming the CMOS integrated circuitry first using a series of processes well known in the art. A passivation layer (e.g. comprising PECVD silicon nitride) can be formed over the CMOS integrated circuitry prior to forming the MEM apparatus 10. This passivation layer, which has a low level of stress due to the relatively low PECVD deposition temperature of 350–400° C., can also be used to protect the CMOS integrated circuitry during the selective wet etching step used to remove the sacrificial material and release the MEM apparatus 10 as previously described.

During fabrication of the MEM apparatus 10, electrical vias can be etched down through the passivation layer to form electrical interconnections between the CMOS integrated circuitry and the MEM apparatus 10, as needed. The CMOS integrated circuitry can be used to provide actuation voltages for operation of the tensile-stressed actuators 14 and 14'.

In general, devices 10 fabricated from CVD-deposited tungsten will be compatible with back-end-of-line processing after first fabricating CMOS circuitry on the substrate 12 due to the relatively low deposition temperatures of ≦400° C. On the other hand, devices 10 formed with a composite thermal CVD silicon nitride and LPCVD polysilicon structure will generally not be back-end-of-line CMOS compatible due to the much higher temperatures for deposition of the LPCVD polysilicon (580° C.) and subsequent annealing thereof (≧800° C.), and for deposition of the thermal CVD silicon nitride (800° C.).

Yet other materials can be used to form the beams 16 and anchors 20 of the tensile-stressed actuators 14 and 14' in the various examples of the MEM apparatus 10 described herein. As an example, silicon carbide, which can be doped for electrical conductivity, can be substituted for tungsten or the silicon nitride/polysilicon composite structure in forming the tensile-stressed actuators 14 and 14' and other elements of the MEM apparatus 10.

The matter set forth in the foregoing description and accompanying drawings is offered by way of illustration only and not as a limitation. The actual number of layers used to build up the platform 18 and the tensile-stressed actuators 14 and 14' can be varied. The molded tungsten process described herein is capable of forming MEM devices 10 having up to ten or more stacked and interconnected layers of tensile-stressed materials such as tungsten or silicon nitride.

Furthermore, although the examples of the MEM apparatus 10 described herein have the tensile-stressed actuators 14 and 14' located at an edge of the platform 18, in other embodiments of the present invention, the tensile-stressed actuators 14 and 14' can be connected proximate to a midpoint on opposite sides of the platform 18, at the corners of the platform 18, or at other arbitrary locations on the platform 18. The tensile-stressed actuators 14 can even be connected to a support post underneath the platform 18 so that the tensile-stressed actuators 14 can completely underlie the platform 18. Although the platform 18 has been described herein as being square, those skilled in the art will understand that the platform 18 can be of arbitrary size including circular, elliptical or polygonal, and of arbitrary dimensions. The actual scope of the invention is intended to be defined in the following claims when viewed in their proper perspective based on the prior art.

What is claimed is:

1. A microelectromechanical (MEM) apparatus, comprising:
   (a) a substrate;
   (b) a pair of tensile-stressed actuators located proximate to each other on the substrate and arranged noncollinearly to provide two oppositely-directed forces due to a built-in longitudinally-directed tensile stress which is directed along the length of at least one beam in each tensile-stressed actuator, with a change in the two oppositely-directed forces being produced by a change in temperature of at least one of the pair of tensile-stressed actuators; and
   (c) a platform suspended above the substrate by the pair of tensile-stressed actuators, with the platform being initially tilted at an angle relative to the substrate in response to the two oppositely-directed forces acting at different locations on the platform due to the built-in longitudinally-directed tensile stress, and with the platform being tiltable at a different angle relative to the substrate with a change in the temperature of at least one of the pair of tensile-stressed actuators.

2. The MEM apparatus of claim 1 further comprising means for changing the temperature of at least one of the pair of tensile-stressed actuators, and thereby changing the angle of tilt of the platform relative to the substrate.

3. The MEM apparatus of claim 2 wherein the means for changing the temperature of at least one of the pair of tensile-stressed actuators comprises a change in an ambient temperature.

4. The MEM apparatus of claim 2 wherein the means for changing the temperature of at least one of the pair of tensile-stressed actuators comprises a voltage applied to one of the pair of tensile-stressed actuators to resistively heat that tensile-stressed actuator.

5. The MEM apparatus of claim 1 wherein the substrate comprises silicon.

6. The MEM apparatus of claim 1 wherein each tensile-stressed actuator comprises tungsten.

7. The MEM apparatus of claim 6 wherein each tensile-stressed actuator further comprises titanium nitride.

8. The MEM apparatus of claim 6 wherein the platform comprises tungsten.

9. The MEM apparatus of claim 8 wherein the platform comprises a mesh structure.

10. The MEM apparatus of claim 1 wherein each tensile-stressed actuator comprises silicon nitride.

11. The MEM apparatus of claim 10 wherein each tensile-stressed actuator further comprises polycrystalline silicon.

12. The MEM apparatus of claim 1 wherein the platform comprises a light-reflecting surface.

13. A microelectromechanical (MEM) apparatus, comprising:
   (a) a substrate;
   (b) a platform suspended above the substrate and further comprising a plurality of platform layers stacked one upon another and interconnected;
   (c) a first tensile-stressed actuator connected between one of the platform layers and the substrate to suspend the platform above the substrate; and
   (d) a second tensile-stressed actuator connected between another of the platform layers and the substrate to suspend the platform above the substrate, with a tensile stress in each tensile-stressed actuator acting to tilt the platform at an angle relative to the substrate.

14. The MEM apparatus of claim 13 wherein the angle of the platform relative to the substrate can be varied in response to actuation of one or both of the tensile-stressed actuators.

15. The MEM apparatus of claim 14 wherein each tensile-stressed actuator can be actuated with an voltage applied thereto.

16. The MEM apparatus of claim 13 wherein the angle of the platform relative to the substrate can be varied in response to an ambient temperature.

17. The MEM apparatus of claim 13 wherein each tensile-stressed actuator comprises at least one tensile-stressed beam.

18. The MEM apparatus of claim 13 wherein the substrate comprises silicon.

19. The MEM apparatus of claim 13 wherein each tensile-stressed actuator comprises tungsten.

20. The MEM apparatus of claim 19 wherein the platform comprises tungsten.

21. The MEM apparatus of claim 13 wherein each tensile-stressed actuator comprises silicon nitride.

22. The MEM apparatus of claim 21 wherein each tensile-stressed actuator further comprises polycrystalline silicon.

23. The MEM apparatus of claim 13 wherein the platform comprises a light-reflecting surface.

24. A microelectromechanical (MEM) apparatus, comprising:
(a) a substrate; and
(b) a platform suspended above the substrate by a plurality of tensile-stressed beams arranged in pairs proximate to the platform, and with one tensile-stressed beam of each pair of tensile-stressed beams being connected to the platform proximate to a top thereof, and with the other tensile-stressed beam of each pair of tensile-stressed beams being connected to the platform proximate to a bottom thereof so that the tensile-stressed beams of each pair of tensile-stressed beams are connected to the platform at two different heights above the substrate, and wherein the plurality of tensile-stressed beams in response to heating thereof generate a torsional force to tilt the platform at an angle to the substrate.

* * * * *